United States Patent

Hein

Patent Number: 5,150,632
Date of Patent: Sep. 29, 1992

[54] SELF ADJUSTING ECCENTRIC PIVOT MECHANISM

[75] Inventor: Richard A. Hein, Rochester, Mich.

[73] Assignee: Hoover Universal, Inc., Plymouth, Mich.

[21] Appl. No.: 722,250

[22] Filed: Jun. 27, 1991

[51] Int. Cl.⁵ .............................................. A47C 1/026
[52] U.S. Cl. ................................... 74/530; 297/354; 297/366; 297/367
[58] Field of Search ............. 74/512, 530; 297/354, 297/366, 367

[56] References Cited

U.S. PATENT DOCUMENTS

| | | | |
|---|---|---|---|
| 2,507,997 | 5/1950 | Roedding | 74/530 OR |
| 3,459,065 | 8/1969 | Fender | 74/530 OR |
| 3,901,100 | 8/1975 | Iida et al. | 74/530 OR |
| 4,159,815 | 7/1979 | Strowik et al. | 74/530 X |
| 4,765,680 | 8/1988 | Kawashima | 74/530 X |
| 4,875,735 | 10/1989 | Moyer et al. | 297/367 OR |
| 4,946,223 | 8/1990 | Croft et al. | 297/367 OR |
| 4,995,669 | 2/1991 | Croft | 297/367 X |

FOREIGN PATENT DOCUMENTS 0518988 11/1955 Canada ................................ 74/530

*Primary Examiner*—Rodney H. Bonck
*Assistant Examiner*—Daniel Wittels
*Attorney, Agent, or Firm*—Harness, Dickey & Pierce

[57] ABSTRACT

A self adjusting eccentric pivot mechanism is disclosed in a seat back recliner assembly which eliminates backlash between the gears of the recliner mechanism to prevent vibration and rattle of a seat back when the seat is unoccupied. The self adjusting pivot includes a pivot pin with an eccentric member rotatable thereon upon which one gear of the recliner mechanism is mounted. A biasing spring rotates the eccentric member to move the gears toward one another such that back lash between the gear teeth is eliminated. The use of a biasing spring provides a self adjusting feature which enables the position of the eccentric member to move as the seat back is adjusted over its range of motion to accommodate variation in the gears.

7 Claims, 2 Drawing Sheets

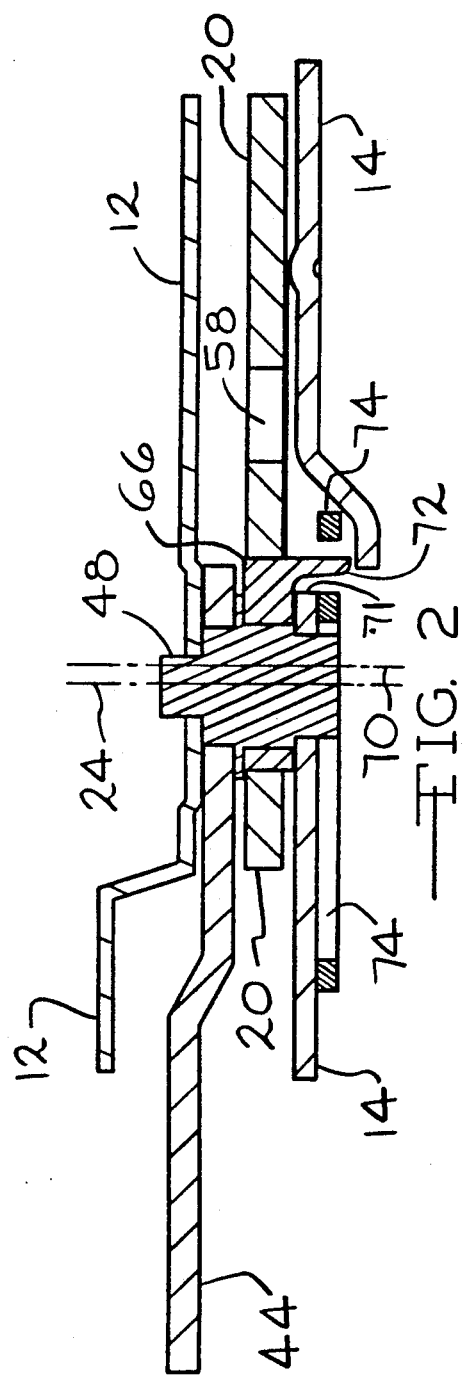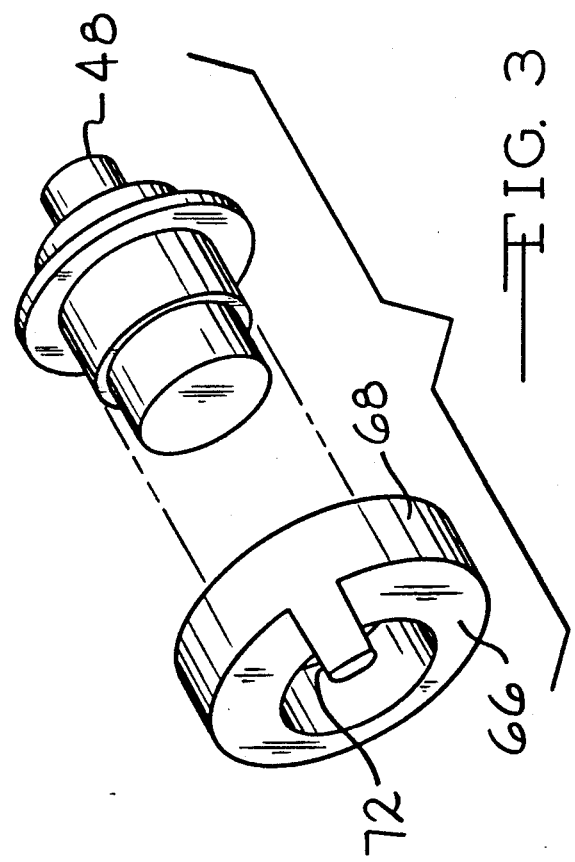

SELF ADJUSTING ECCENTRIC PIVOT MECHANISM

BACKGROUND AND SUMMARY OF THE INVENTION

The present invention pertains to a self adjusting eccentric pivot mechanism and in particular to a pivot mechanism for a vehicle seat recliner assembly to eliminate backlash in the recliner assembly gears.

In many mechanical applications, motion is transferred from one element to another by rotation of a first element while in contact with a second element. A typical application is a geared system comprising a drive gear and a driven gear. In applications where the output loading is relatively constant, i.e. where the resistance to rotation of the driven gear remains constant, contact is maintained between the drive and driven gears by this output loading. At certain times, however, variable output loading or variable input conditions can cause intermittent loss of contact between the drive and driven gears. This loss of contact can produce undesirable consequences such as variations in the output velocity, uneven wear on the contact surfaces or undesirable noise patterns.

Loss of contact can be due to various reasons such as processing variations in the manufacture of the elements or gears in the system such as the eccentricity of the input or output gears, variations in the distance between input and output gears and variations in the pivot axis location. Typical gearing systems are designed with a small clearance between the engaging gear teeth called backlash to allow for process variations. In some applications this clearance is manually adjusted at assembly to maintain a predetermined clearance without creating binding or excessive wear of the gear teeth.

One example of a gear system is a seat back recliner of a vehicle seat assembly. In many recliner mechanisms, the seat back is carried by a pair of support arms pivotally mounted to the lower seat frame or seat cushion. The support arm, at least on one side of the seat assembly, forms a sector gear portion with a number of gear teeth positioned in an arc about the seat back pivot axis. A pinion gear rotatably carried by the seat frame has teeth meshing with the teeth of the sector gear portion. The seat back is locked in place by a lock mechanism that prevents rotation of the pinion gear. This lock is selectively releasable to allow the pinion gear, and hence the seat back support arm, to both rotate about their respective axes to adjust the reclined position of the seat back.

As is typical with gearing systems, there is backlash present between the teeth of the pinion gear and the teeth of the sector gear portion which allows some movement of the sector gear portion relative to the locked pinion gear. This backlash will allow the seat back of an unoccupied seat assembly to vibrate when the vehicle encounters certain road conditions. The vibration and noise caused by the vibration is amplified by the seat back frame such that at the top of a seat back the movement can be relatively large. The noise and vibration can result in customer concerns and complaints.

One solution to the vibration and noise problem is to provide an eccentric pivot for either the seat back arm or the pinion gear which is used to set the location of the pivot axis of one of the two gears at the time of assembly to provide the minimum backlash necessary for proper operation of the mechanism. While this eliminates excessive backlash, the solution is not a complete solution. Some backlash must remain to prevent binding of the gear teeth. In addition, since the gears themselves may not be concentric, the minimum backlash at one position of the gears may provide excessive backlash at a second position of the gears or may cause binding of the gears.

It is an object of the present invention therefore to provide a self adjusting eccentric pivot to provide a predetermined minimal loading on the gear teeth to maintain proper contact of the sector gear portion teeth with the pinion gear teeth at all times. The gear engaging force must be sufficient to prevent vibration of the seat back during road conditions expected to be encountered by the vehicle.

It is a feature of the self adjusting pivot to enable the pivot axis of one gear to move relative to the other gear throughout the range of motion of the gears to adjust for variations along the circumference of the two gears.

The self adjusting pivot includes a pivot pin with an eccentric member rotatably carried thereon. The eccentric member has an outer periphery that is eccentric relative to the axis of the pivot pin. It is upon this eccentric shoulder that one of the two gear members is rotated. A biasing spring is coupled to the eccentric member to rotate the eccentric member in a direction tending to urge the eccentric axis into a position disposed between the axis of the first pivot and the axis of the other gear such that the two gears are forced toward one another. By forcing the gears together, backlash between the gears is eliminated. Thus, the vibration of the seat back and the noise produced is thereby eliminated. The biasing spring enables the eccentric member to rotate and move the sector gear either toward or away from the pinion gear as the gears are rotated to accommodate variations in the gears themselves to avoid binding.

Further objects, features and advantages of the invention will become apparent from a consideration of the following description and the appended claims when taken in connection with the accompanying drawings.

BRIEF DESCRIPTION OF THE DRAWINGS

FIG. 2 is a sectional view of the recliner mechanism as seen from substantially the line 2—2 of FIG. 1; and FIG. 3 is a perspective view of the eccentric member and the pivot pin.

DETAILED DESCRIPTION OF THE INVENTION

Figure 1:
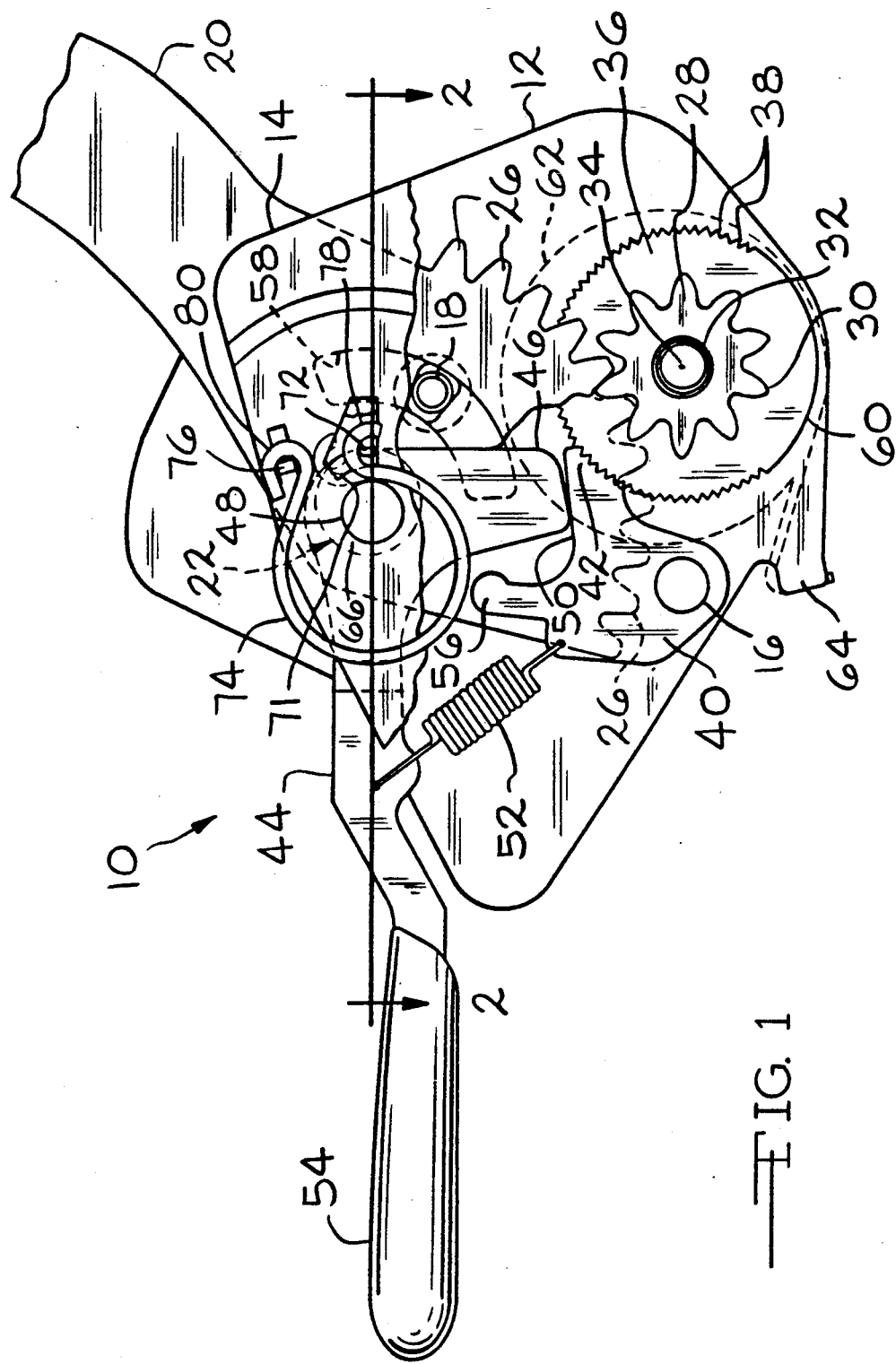
FIG. 1 is a fragmentary side view of a recliner mechanism including the self adjusting eccentric pivot mechanism of the present invention.

The recliner assembly 10 shown in FIG. 1 includes the self adjusting eccentric pivot mechanism of the present invention. Recliner assembly 10 includes outboard support plate 12 and inboard support plate 14. The designations inboard and outboard are given merely to define relative location on a seat assembly and to distinguish one plate from another and are not to be construed as limitations. The support plates are connected together by two or more pins such as pins 16 and 18. The support plates 12 and 14 are secured to a lower seat frame (not shown). As such, the support plates 12 and 14 form a portion of the lower seat frame.

The seat back frame includes two downwardly extending arms with one arm on each side of the seat assembly. The support arm 20 shown in FIG. 1 is on one side of the seat assembly and forms a part of the recliner assembly 10. Support arm 20 is mounted for rotation about pivot 22 to enable the seat back to rotate relative to the lower seat cushion. A static pivot accepts the seat back arm on the opposite side of the seat assembly.

The seat back support arm 20 is formed with a plurality of gear teeth 26 in a circular arc forming a sector gear portion on the seat back support arm 20. A pinion gear 28, having teeth 30, is fixed to a pivot shaft 32 carried by the two support plates 12 and 14. The axis 34 of pivot shaft 32 is generally parallel to the lateral axis 24 about which the seat back is rotated. A locking gear 36 is fixed to the pinion gear 28 through pivot shaft 32 so that the locking gear and pinion gear rotate together about axis 34. The majority of the periphery of locking gear 36 is formed with teeth or serrations 38. A pawl 40 is rotatably mounted to the support plates 12 and 13 about the pin 16. The pawl 40 has a serrated portion 42 for engagement with the serrations 38 of the locking gear. When the pawl is rotated into locking engagement with the locking gear 36, rotation of the locking gear and the pinion gear is prevented. As a result of the meshing of the sector gear teeth 26 with the pinion gear teeth 30, the seat back arm 20 is also fixed in position.

A release lever 44 having a cam portion 46 is mounted for rotation about one shoulder of pivot pin 48, about pivot axis 24. The cam portion 46 engages a cam surface 50 of the pawl 40 to force the pawl serrations into engagement with the serrations of the locking gear. A biasing spring 52 coupled to the release lever 44 pulls the handle 54 of the release lever down urging the cam portion 46 of the lever into engagement with the cam surface 50 of the pawl forcing the pawl serrations into locking engagement with the locking gear.

To release the seat back support arm 20, the release lever 44 is rotated clockwise by upper motion of the handle 54. This causes the cam portion 46 to disengage from the cam surface of the pawl and to contact pawl release finger 56, rotating the pawl out of engagement with the locking gear. This frees the pivot shaft 32 for rotation about its axis, enabling the pinion gear 28 and consequently the seat back support arm 20 to rotate about their respective axes. When the seat back has been rotated to a desired position, the handle 54 is released and spring 52 returns the release lever and cam to a position in which the pawl reengages with the locking gear to hold the seat back in place.

An arcuate slot 58 is formed in the seat back support arm 20 with the pin 18 extending through the slot. The ends of the slot contact the pin 18 to limit travel of the seat back support arm in each direction.

The locking gear 36 includes peripheral portion 60 that does not include the serrations 38. This smooth portion engages the pawl when the seat back is rotated forward to a dump position. In the forward dump position, the pawl does not act to hold the locking gear in place after the lever 44 has been released. This enables the seat back to be rotated rearwardly from the forward dump position without the necessity of first operating the release lever. The locking gear is free to rotate until the seat back has returned to its forwardmost locked position when the pawl will once again engage the serrations of a locking gear.

A clock spring 62 is coupled to the pivot shaft 32 and to the support plate 12 at 64 to urge the pivot shaft 32 to rotate in the proper direction to rotate the seat back forward when the pawl 40 is disengaged. To adjust the seat back position rearward, the seat occupant rotates the release lever upward and applies pressure to the seat back to overcome the spring 62 and move the seat back rearward. To adjust the seat back forward, the occupant rotates the release lever upward and relieves pressure on the seat back allowing the spring 62 to rotate the seat back forward.

Because of the backlash in the gear teeth as well as manufacturing variation in the recliner assembly, the sector gear teeth 26 are allowed to move slightly relative to the pinion gear teeth 30 with the result that the seat back can vibrate when the seat is unoccupied and certain road conditions are encountered. Due to the length of the seat back, the upper end of the seat back can move a considerable distance as the seat back vibrates. Along with the vibration, noise is created that can be a nuisance to vehicle occupants and can result in customer complaints to the vehicle manufacturer.

The backlash in the gear teeth is necessary to prevent binding of the gear teeth during normal operation caused by manufacturing variation in several components of the seat assembly. The variation in the components can affect the location of the pivot axes of the various components as well as the diameter and concentricity of the sector gear and pinion gear. To avoid the vibration and rattles caused by backlash, and other mechanism clearances, the pivot 22 is formed by a pivot pin 48 concentric about the lateral axis 24 and an eccentric member 66 rotatably carried by the pivot pin 48. The eccentric member has a peripheral surface 68 which is eccentric about the pivot pin 48 creating an eccentric or moving axis 70. The support arm 20 is rotatable about the eccentric member 66.

The eccentric member includes an axially extending finger 72 which protrudes through an arcuate aperture 71 in support plate 14. One end of a C-shaped biasing spring 74 has been wrapped around axial finger 72. The opposite end of the spring 74 is wrapped around a raised tab 76 extending from the support plate 14. The C-spring 74 is formed so as to expand, tending to separate the finger 72 of the eccentric member from the tab 76 of the support plate. The biasing spring, by attempting to open, causes the eccentric member 66 to rotate in a clockwise direction as viewed in FIG. 1. In other words, the eccentric member is biased in a direction tending to move the eccentric axis 70 toward the pivot shaft axis 34. In so doing, the support arm 20 is urged toward the pinion gear 28 forcing the sector gear teeth 26 into engagement with the pinion gear teeth 30 eliminating backlash. By eliminating backlash between the gear teeth, the vibration and rattle of the seat back are also eliminated. The C-spring 74 has been chosen as a bias means for its compact size, relatively low internal stress and relatively high output per unit volume. Other springs can also be used as well as any mechanical energy storage means, pneumatic, hydraulic, etc.

By being a self adjusting eccentric, as the seat back is adjusted to various reclined positions, manufacturing variations in the concentricity of either of the gears can be accommodated by deflection of C-spring 74 either in an opening or closing manner so that the sector gear portion moves closer or further from the pinion gear respectively. Thus, the backlash is eliminated for all positions of the gear train and binding of the gears due to no backlash is prevented. This provides an advantage over a fixed eccentric pivot that fixes the backlash of only a single position of the gear train.

When a load is applied to the seat back which is resisted by the pinion gear to prevent rotation of the seat back, the force component acting on the gear teeth to separate the two gears will work against the C-spring 74 causing the eccentric to rotate the support arm 20 away from the pinion gear. Rotation of the eccentric is limited by the limits defined by aperture slot 71. Once the extending finger 72 contacts the limit defined by the slot, further rotation of the eccentric member is prevented. This provides a stop to the separation of the sector gear teeth from the pinion gear teeth to avoid not only total separation of the gear teeth but also a situation in which the cross sectional area of the teeth at the point of load application is not appreciably reduced.

The self adjusting eccentric pivot overcomes the problems associated with the gear tooth backlash to prevent vibration and rattle of the seat back and does so in a superior manner compared to an eccentric pivot that is fixed and set at the time of assembly of the mechanism. The self adjusting pivot does not require a separate operation to fix the position of the eccentric pivot and in addition can self adjust to accommodate variations along the range of motion of the gear system to ensure that backlash is eliminated regardless of the reclined position of the seat back.

It is to be understood that the invention is not limited to the exact construction illustrated and described above, but that various changes and modifications may be made without departing from the spirit and scope of the invention as described in the following claims.

I claim:

1. A self adjusting pivot mechanism comprising:
   support means;
   a pivot pin supported by said support means defining a pin axis;
   an eccentric member mounted to said pivot pin for rotation about said pivot pin, said eccentric member having a periphery eccentric to said pin axis;
   a first member rotatable about the periphery of said eccentric member;
   a second member supported by said support means for rotation about a second axis generally parallel to said pin axis, said first and second members engaging one another in a driver/driven relationship whereby rotation of one of said first or second members induces rotation of the other member; and
   means for rotationally biasing said eccentric member about said pin in a direction to move said first member toward said second member to produce a minimum engagement force between said first and second members.

2. The pivot mechanism of claim 1 wherein said first and second members are gears and said bias means and said eccentric member force the teeth of said gears into engagement with one another to eliminate backlash between the gear teeth.

3. The pivot mechanism of claim 1 wherein said bias means includes a spring coupled to said support means and said eccentric member to urge said eccentric member in the direction to move the eccentric axis defined by the periphery of said eccentric member toward said second member.

4. Recliner mechanism for a seat assembly comprising:
   support means;
   a seat back arm pivotally mounted to said support means about a first pivot, said seat back arm forming a sector gear portion along a peripheral portion of said seat back arm about said first pivot;
   a pinion gear pivotally mounted to said support means about a second pivot, the teeth of said pinion gear meshing with the teeth of said sector gear portion of said seat back support arm;
   means for locking said pinion gear to prevent rotation of said pinion gear about said second pivot whereby said seat back support arm is held in a fixed position about said first pivot, said first pivot including a pivot pin fixed to said support means defining a first axis and an eccentric member rotatably mounted on said pivot pin forming an eccentric shoulder having a second axis about which said support arm is rotated; and
   bias means for rotating said eccentric member in a direction to urge said second axis toward second pivot whereby said sector gear portion is urged against said pinion gear to eliminate backlash between the teeth of said sector and pinion gears.

5. The recliner mechanism of claim 4 wherein said biasing means includes a spring coupled to said support means and to said eccentric member.

6. The recliner mechanism of claim 5 wherein said spring is generally C-shaped with the ends of said spring desiring to separate from one another with one spring end coupled to said support means and the other spring end coupled to said eccentric member.

7. The recliner mechanism of claim 6 wherein the ends of said spring engage one another to stop movement of said eccentric member and said sector gear away from said pivot gear during rotational loading of said gears to prevent separation of the sector gear teeth from the pinion gear teeth.

* * * * *